Figure 1:
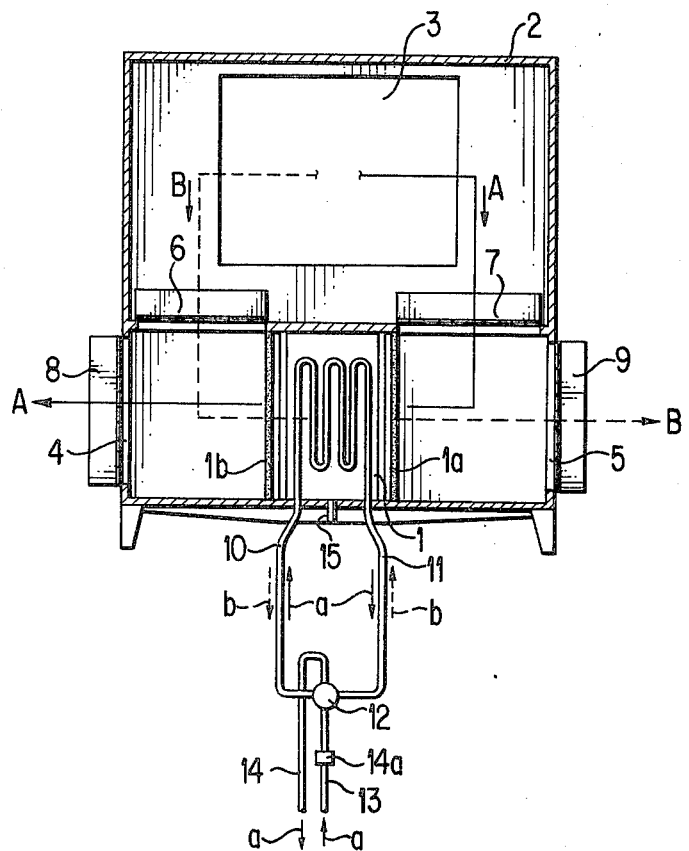

United States Patent [19]
Bergdahl

[11] 3,980,129
[45] Sept. 14, 1976

[54] HEAT EXCHANGE IN VENTILATION INSTALLATION

[76] Inventor: Knut Bergdahl, Kvartsgrand 4, 852 52 Sundsvall, Sweden

[22] Filed: Dec. 4, 1974

[21] Appl. No.: 529,525

[30] Foreign Application Priority Data
Dec. 4, 1973  Sweden .............................. 7316326

[52] U.S. Cl. .................................... 165/17; 62/80; 165/1; 165/16; 165/59; 165/66
[51] Int. Cl.² .......................................... A23C 3/02
[58] Field of Search ............... 165/1, 59, 66, 16, 17, 165/97, 101; 237/80; 62/80, 81, 82

[56] References Cited
UNITED STATES PATENTS

| | | | |
|---|---|---|---|
| 2,048,137 | 7/1936 | Palmer ................................... | 165/17 |
| 2,376,859 | 5/1945 | Benn ...................................... | 165/16 |
| 2,862,434 | 12/1958 | Edwards ............................... | 165/59 |
| 2,934,323 | 4/1960 | Burke .................................... | 165/17 |
| 3,189,085 | 6/1965 | Eberhart ............................... | 165/17 |
| 3,193,000 | 7/1965 | Bressoud .............................. | 165/16 |
| 3,354,945 | 11/1967 | Grudeborn ........................... | 165/16 |
| 3,387,649 | 6/1968 | Mullins ................................. | 165/59 |
| 3,788,388 | 1/1974 | Barkmann ............................ | 165/59 |

Primary Examiner—Charles J. Myhre
Assistant Examiner—Daniel J. O'Connor
Attorney, Agent, or Firm—Dorfman, Herrell and Skillman

[57] ABSTRACT

Recuperative heat exchangers are disposed in the supply and exhaust ducts of a ventilating system. To reduce frost build-up at the exit end of the exhaust-duct heat exchanger, the heat exchanger is disposed so that the exhaust air flows through it alternately from one end to the other, and vice-versa, when the temperature is below freezing. The reversal of flow of the exhaust air is accompanied by a reversal of the flow of heat exchange medium so that the efficiency of heat exchange is not adversely affected. Several systems of heat exchange are disclosed.

10 Claims, 6 Drawing Figures

HEAT EXCHANGE IN VENTILATION INSTALLATION

This invention relates to a method of defrosting a recuperative heat exchanger disposed in the exhaust air duct of an airconditioning installation, in particular to a system in which sensible heat from the exhaust air is transferred to the supply air using opposed flow, i.e., either cross-current or countercurrent flow.

With rising energy costs, in latter years, the heat recovery in ventilation installations has become increasingly important. There exist a great number of heat recovery systems of various types. The present invention relates to the type of system, which operates with a heat exchanger in the spent or exhaust air duct and where the heat is transferred to the supply air flow either directly wherein the heat exchanger is an air/air heat exchanger, or indirectly by utilizing a heat carrying medium for transferring the heat. In the lastmentioned case, the heat recovery unit may comprise two finned batteries of tubes or plates coupled together the liquid communication, and a pump, by means of which the liquid is circulated between the two finned batteries. The heat exchange between the spent air flow of the ventilation system, i.e. the hot air exhaust flow, and the cold supply air flow takes place thereby that the finned batteries are placed one in the spent air duct and one in the supply air duct. The finned batteries usually are assembled of copper tube coils with attached fins in the form of aluminum sheets. As heat exchange medium normally a liquid mixture of water and glycol is used. The heat recovery unit of this design provides the advantage, among others, that the supply air and spent exhaust air ducts can be placed at a large distance from each other. The heat transfer between the heat exchanger in the spent air duct and that in the supply air duct may also take place by the use of heat tubes or pipes which employ a refrigerant as a heat conductor and use the energy of the changes in state of the refrigerant to effect flow at the refrigerant in the operation of the pipe. The two heat exchangers then are arranged adjacent one another each in one duct and comprise a great number of heat tubes inserted in a package of sheets. Each heat tube in the heat pipe usually is shaped as a straight tube and extends through the two ducts in such a manner, that one end is located in the spent air flow and the other end is located in the supply air flow. The heat tubes in the pipe, further, are disposed horizontally, which arrangement is conditioned by the mode of operation of the pipe.

One problem with the aforesaid heat recovery installations is the ice formation occurring in the spent air duct at low outside temperatures. The ice formation on said duct is due to the fact that the spent air usually is moist. Upon its cooling, therefore, condensation water deposits on the tube and sheet surfaces and, if these surfaces have a temperature below 0°C, the water freezes to ice. It depends, of course, on the thermal efficiency degree of the unit and the temperature and relative moisture of the spent exhaust air at which outside air temperature said ice formation in the spent air duct will occur. Typical values for the thermal efficiency degree, e.g. for recuperative heat recovery units, usually lie between 50 and 70%, and the relative moisture of the spent air often amounts to 20–50%. This involves the risk of ice formation in these cases usually arising at outside temperatures between −5°C and −15°C when the spent air temperature is +22°C, i.e. normal room temperature. In order to prevent ice formation, or to melt the ice formed, a partial flow of the supply air has continuously or intermittently been passed-by the air/air heat exchanger, or the flow of the heat exchange medium between the heat exchanger in the supply air duct and that in the spent or exhaust air duct has been reduced.

These measures, however, involve a decrease in the thermal efficiency degree of the heat recovery unit, either during the time there is risk of ice formation or during the ice melting process proper. In both cases, from the aspect of a longer time interval, the total efficiency degree decreases.

The object of the present invention is to overcome the aforesaid disadvantages and to provide a method of defrosting, which can be carried out with continuous heat recovery and with maintained high thermal efficiency degree of the recovery installation. This object is achieved according to the method as it is defined in the attached claims.

Figure 2:
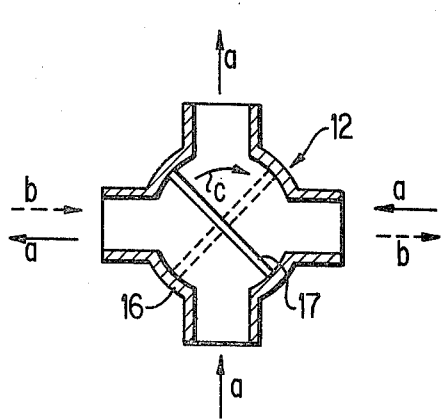
Figure 3:
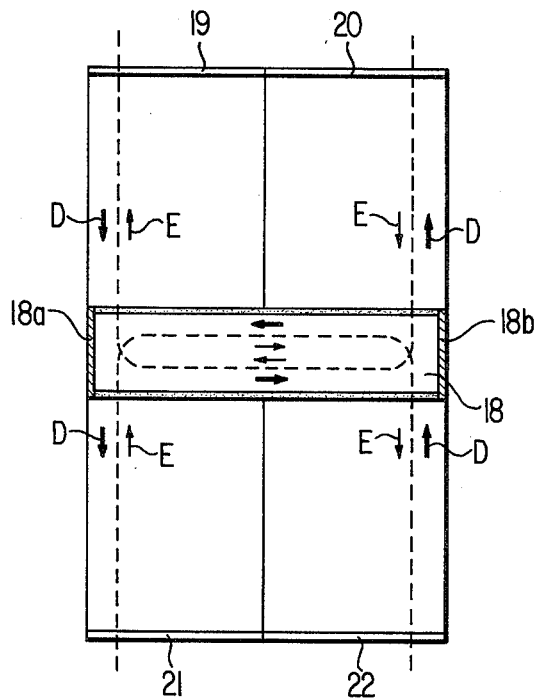
Figure 4:
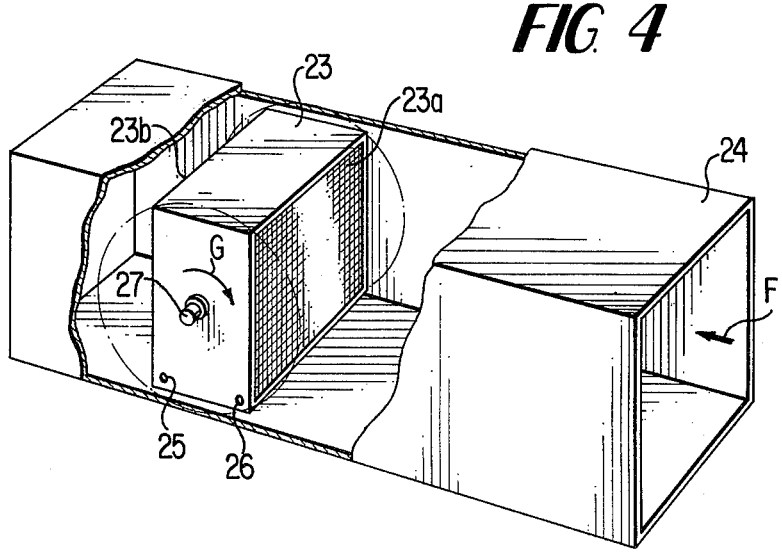
Figure 5:
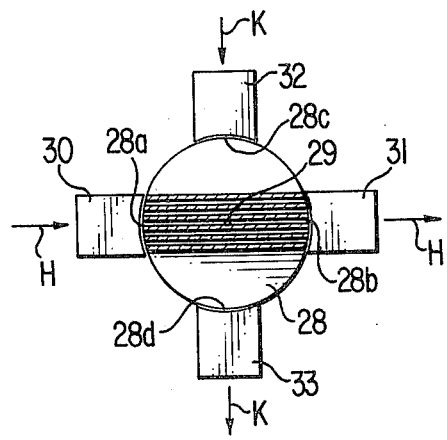
Figure 6:
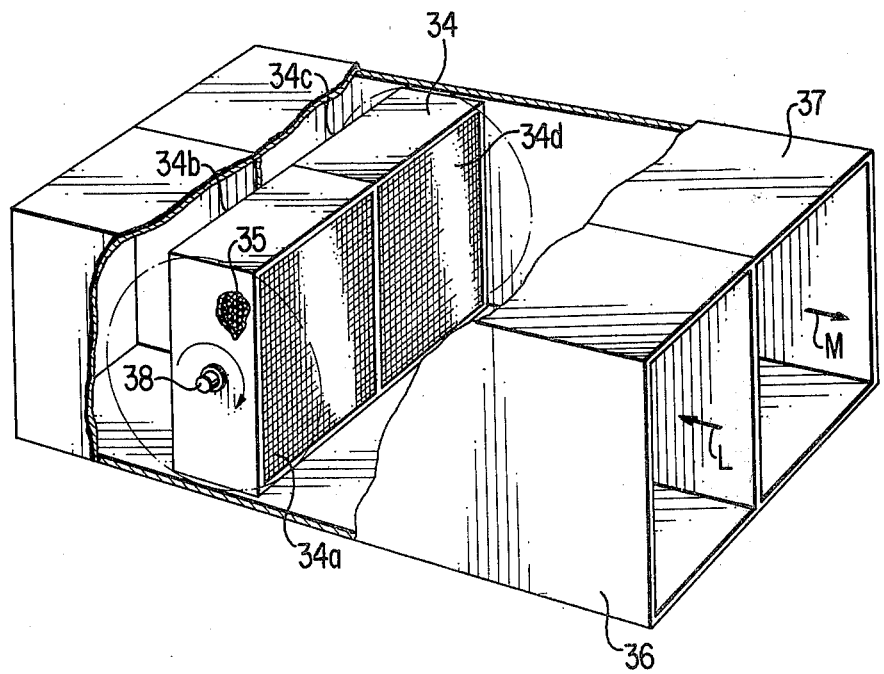

The invention is described in greater detail in the following, with reference to the accompanying drawings, in which FIG. 1 is a section through a liquid/air heat exchanger in the spent or exhaust air duct, FIG. 2 shows in detail a section through a liquid valve, FIG. 3 is a section through an air/air heat exchanger in the spent or exhaust air duct, FIG. 4 shows a liquid/air heat exchanger being rotatable, FIG. 5 shows an air/air heat exchanger being rotatable, FIG. 6 shows a rotary heat exchanger formed as a heat pipe with heat tubes.

In FIG. 1 a liquid/air heat exchanger 1 is disposed in a heat-insulated housing 2, which is provided with an air inlet 3 to be connected to the spent or exhaust air duct. The housing also is provided with air outlets 4 and 5, respectively, to be connected also to the spent air duct. Within said housing are provided two dampers 6 and 7, and at the air outlets 4 and 5 are provided dampers 8 and 9. The heat exchanger 1 with heat-transfer liquid lines 10 and 11 is connected via the liquid valve 12 to the liquid lines 13 and 14, which in their turn are connected to a heat exchanger (not shown) in the supply air duct. The numeral 14a relates to a transmitter inserted in the liquid line 13 for sensing the temperature of the liquid flow. The heat recovery installation operates as follows. The spent air, in the first operation case, flows in through the air inlet, passes through the heat exchanger from one end 1a (the entrance end) to the other end 1b (the exit end) and flows out through the air outlet 4 as schematically indicated by the arrow A. The dampers 7 and 8 are then open, while the dampers 6 and 9 are closed. In this case of operation, heat-transfer liquid flows from the supply air heat exchanger through the liquid line 13 via the valve 12 and line 10 into the heat exchanger 1. From the heat exchanger, liquid flows through the line 11 and via the valve 12 and line 14 back to the heat exchanger in the supply air duct. The flow direction of the liquid is indicated by the fully drawn arrows a. In particular the heat exchange medium flows from the end 1b of the exchanger to the end 1a. The heat exchanger, thus, operates in a countercurrent manner.

When the outside temperature is low, the water vapor condensed from the spent air on the heat exchanger gradually develops into ice. This ice formation takes place in the coldest zone of the heat exchanger which is the exit end 1b of the heat exchanger where the spent or exhaust air leaves and the heat exchange liquid flow enters the heat exchanger.

In order to melt the ice formed, according to the invention the direction of the two media through the heat exchanger is periodically reversed, so that the counterflow is maintained. At the embodiment shown, this is effected thereby that the dampers 7 and 8 are closed, and the dampers 6 and 9 are opened at the same time as the direction of the liquid through the heat exchanger is reversed by adjusting the valve 12. The spent air now passes through the heat exchangers in the direction indicated by the arrow B from the new entrance end at 1b to the new exit end at 1a, and the liquid flows to the heat exchanger through the line 11 and therefrom through the line 10 from the new exit end at 1a to the new entrance end at 1b as indicated by the arrows b. The direction of the liquid through the lines 13 and 14, however, remains unchanged. Owing to the countercurrent relation being maintained in the heat exchanger, but now with the directions of the two media reversed, that zone in the heat exchanger which in the preceding case of operation was hottest now is the cold zone, while the zone, which previously was the coldest one, with resulting ice formation, now will be the hot zone. Hereby, the ice formed melts, and the melt water can flow out through the drain hole 15. At the same time as the ice melts, new ice, of course, will form, but this takes place in the zone now being the cold zone. After the ice is molten, the flow direction of the media again is reversed, and a new ice melting and ice formation phase, respectively, commence. Owing to the said mode of operation the heat recovery can be maintained without interruption and with maintained high efficiency degree. The intervals between the two phases suitably can be controlled automatically by means of program devices according to known art. The temperature conditions at which ice formation can take place are sensed by means of transmitters. Such a transmitter 14a is shown in the liquid line 13.

FIG. 2 shows in detail an embodiment of the liquid valve 12, which comprises a housing 16 provided with four connections for liquid lines. Within the housing, a valve disc 17 is provided, which is reversible to two positions. The valve disc being in its first position, the liquid flows therethrough as indicated by the arrows a. Upon reversing said valve disc as indicated by the arrow c, the direction of the liquid is reversed as shown by the arrows b. The reversal of the valve disc is effected by means of an adjusting device (not shown), which may be of pneumatic, hydraulic or electromechanic type.

In FIG. 3 the invention is shown applied to a direct-acting air/air heat exchanger 18. The spent or exhaust air duct is connected to the connecting flanges 19 and 20, while the supply air duct is connected to the flanges 21 and 22. In the embodiment shown, the air media flow through the heat exchanger in a countercurrent flow, but it should be mentioned that in air/air heat exchangers embodiments with cross-flow operation can also be applied advantageously. In the first operation case, the supply air and the spent air flow in the direction indicated by the arrows D. The exhaust air flows through the exchanger from left to right from the entrance end 18a to the exit end 18b, and the supply air flows from right to left from the exit end 18b to the entrance end 18a. Thereby freezing commences in that zone of the heat exchanger 15b where the spent air leaves and the supply air enters the heat exchanger. By reversing the two air flows through the heat exchanger as indicated by the arrows E, by means of a damper arrangement not described here in greater detail, the ice formed at 18b is melted by hot spent air being blown thereagainst. Due to short intervals between the reversals, the temperature of the supply air leaving the heat exchanger is varied only insignificantly.

In FIG. 4 a liquid/air heat exchanger 23 is shown which is provided in the spent air duct 24. The heat exchanger is coupled via the connections 25 and 26 to liquid lines, which via a liquid valve, e.g., of the aforementioned design, are connected to a heat exchanger in the supply air duct. The spent air flows all the time in the direction indicated by the arrow F. Within the heat exchanger, the liquid and air media have countercurrent flow. Air enters at 23a and exits at 23b and liquid enters through 25 at 23b and exits through 26 at 23a. Upon commencing ice formation in the cold zone of the heat exchanger at 23b, the heat exchanger, which is mounted rotatably about the axle 27, turns through 180° as indicated by the arrow G. At the same time the flow direction of the liquid medium flowing in and out, respectively, through the connections 25 and 26 is reversed by the liquid valve (not shown). Air then enters the reversed heat exchanger at 23b and exits at 23a whereas liquid enters through 26 at 23a and exits through 25 at 23b. The counterflow conditions, thus, are maintained also after the rotary movement of the heat exchanger, and defrosting can take place as described above.

It is to be pointed out that an air/air heat exchanger can be designed reversible in the air duct, and with counterflow or cross-flow between the media. In FIG. 5 a heat exchanger of the lastmentioned type is shown in a schematic way. The heat exchanger body 28 is supported rotatably about an axle 29. The flow of the spent or exhaust air to and from the connections 30 and 31 of the heat exchanger is indicated by the arrows H, while the flow of the supply air to and from the connections 32 and 33 of the heat exchanger is indicated by the arrows K. Exhaust air enters the exchanger at 28a and exits at 28b whereas supply air enters at 28c and exits at 28d. When ice has been formed in the cold zone of the heat exchanger, the heat exchanger is turned through 180° so that the ice will be in the hot zone of the heat exchanger where it will melt. Exhaust air then enters at 28b and exits at 28a whereas supply air enters at 28d and exits at 28c.

FIG. 6 shows a heat exchanger 34 comprising a heat pipe with heat tubes 35 extending through the spent air duct 36 and supply air duct 37. The heat exchanger is supported rotatably about the axle 38. In the heat exchanger 34, the spent air flows in the direction of the arrow L from 34a to 34b, while the supply air flows according to the arrow M from 34c to 34b. The heat transfer, effected by the refrigerant in the tubes 35, thus, takes place in counterflow. When ice forms at 34b in the cold zone of the heat exchanger, the heat exchanger is turned through 180° about its axle 38. Exhaust air then enters at 38b and exits at 34a and supply air enters at 38d and exits at 34c. The counterflow condition in the heat exchanger is thereby maintained, and the ice will melt as described above with heat being continuously recovered. It is, of course, also possible to reverse the air flows through a heat pipe heat exchanger by means of damper arrangements, but this embodiment has not been described in detail.

In all of the aforedescribed embodiments of the invention the achievement is made that the heat recovery can take place whilst defrosting is going on. Hereby, from the aspect of a longer time interval, a high efficiency degree for the process of the heat recovery is obtained. It can be mentioned, that the reversing of the media flow through the heat exchanger advantageously can take place at short time intervals. As an example may be stated that the shifting may take place as often as once per minute, but the choice of the shifting period, of course, depends on the type of heat exchanger which is used and on the operation temperature conditions prevailing at the time in question. The time interval between the shiftings, thus, may also be made relatively long, e.g. one shifting per quarter of an hour, per half on hour, per hour or per variants therebetween.

It may be mentioned that the reversal of the air flow through the aforedescribed heat exchanger types implies a cleaning effect on the heat exchanger elements. This cleaning effect is particularly significant at rapid reversal of the air flow and at a high air rate through the heat exchanger. This rate may be e.g. 3m/s. Heat recovery at ventilation installations is mostly required during cold periods of the year. During warm periods or during periods when the spent air is recirculated, for instance in night operation, the heat recovery heat exchangers should preferably not be supplied with air. An advantage with the turnable heat exchangers, described above, is that they can be turned into a position, where the air flow passes by and not through the heat exchanger. In embodiments according to FIG. 4 and FIG. 6 this position is obtained, when the heat exchanger is turned through 90° about its axle.

What I claim is:

1. A method of defrosting a heat exchanger, which is disposed in the exhaust air duct of a ventilation installation for the recovery of heat between the exhaust air and the supply air and operates with two media with opposed flow, comprising the step of periodically reversing the flow directions of the two heat exchanging media in the heat exchanger to establish two alternating cold and hot zones in the heat exchanger whilst maintaining the opposed flow, for periodically defrosting said zones of the heat exchanger in alternation while the heat recovery is going on continuously.

2. A method according to claim 1, characterized in that the heat recovery is effected by disposing a liquid-/air heat exchanger in the exhaust air duct and connecting the liquid circuit of the exchanger to a liquid/air heat exchanger disposed in the supply air duct.

3. A method according to claim 1, characterized in that the heat recovery is effected by disposing an air/air heat exchanger in the exhaust and supply air ducts to effect heat transfer between the exhaust air flow and the supply air flow, respectively.

4. A method according to claim 1, characterized in that the heat recovery is effected by disposing a heat pipe heat exchanger in the spent air duct and extending into the adjacent supply air duct the heat exchange media flows being constituted by the spent air flow and the supply air flow, respectively.

5. A method according to claim 1 wherein the reversal of the media flows through the heat exchanger is effected by reversing the flow directions while maintaining the exchange stationary.

6. A method according to claim 1 wherein the reversal of the two media flows through the heat exchanger is effected by turning the heat exchanger.

7. A method according to claim 2 wherein the reversal of the air flow through the heat exchanger takes place by turning the heat exchanger in the air flow, and the reversal of the liquid flow is effected by adjusting a valve.

8. A method according to claim 1 wherein the reversal of air flow is effected by turning the heat exchanger 180° about a transverse axis, and the heat exchanger during the turning passes a position where the air flows passes by the heat exchanger.

9. A method according to claim 1 wherein said periodic reversal of the flow direction is effected on a timed basis.

10. A method according to claim 1 wherein the temperature of the heat exchange medium is sensed, and the reversal is initiated when the temperature sensed falls below a predetermined point.

* * * * *

UNITED STATES PATENT OFFICE
CERTIFICATE OF CORRECTION

Patent No. 3,980,129  Dated September 14, 1976

Inventor(s) Knut Bergdahl

It is certified that error appears in the above-identified patent and that said Letters Patent are hereby corrected as shown below:

Column 2, line 52, after "exchanger" insert --1--;
Column 4, line 2, "heat exchanger 15b" should be --heat exchanger 18b--.

Signed and Sealed this

Sixteenth Day of November 1976

[SEAL]

Attest:

RUTH C. MASON
Attesting Officer

C. MARSHALL DANN
Commissioner of Patents and Trademarks